(12) United States Patent
Fuchigami et al.

(10) Patent No.: US 8,545,637 B2
(45) Date of Patent: Oct. 1, 2013

(54) CLEANING DEVICE AND CLEANING METHOD

(75) Inventors: Akihiro Fuchigami, Kanagawa (JP); Tatsuya Satoh, Tokyo (JP); Yoichi Okamoto, Kanagawa (JP); Yuusuke Taneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 452 days.

(21) Appl. No.: 12/867,130

(22) PCT Filed: Feb. 24, 2009

(86) PCT No.: PCT/JP2009/053792
§ 371 (c)(1),
(2), (4) Date: Aug. 11, 2010

(87) PCT Pub. No.: WO2009/107826
PCT Pub. Date: Sep. 3, 2009

(65) Prior Publication Data
US 2010/0307535 A1    Dec. 9, 2010

(30) Foreign Application Priority Data

Feb. 27, 2008  (JP) ................................ 2008-045345
Jan. 7, 2009   (JP) ................................ 2009-001496

(51) Int. Cl.
*B08B 5/02*  (2006.01)
*B08B 5/04*  (2006.01)

(52) U.S. Cl.
USPC ........ 134/21; 134/9; 134/10; 134/15; 134/37; 15/300.1; 15/306.1; 15/309.1; 15/312.1

(58) Field of Classification Search
USPC .................. 134/9, 10, 15, 21, 37; 15/300.1, 15/312.1, 306.1, 309.1
See application file for complete search history.

(56) References Cited

U.S. PATENT DOCUMENTS

| | | | |
|---|---|---|---|
| 4,400,846 A * | 8/1983 | Sanderson ................... | 15/309.1 |
| 7,730,896 B2 | 6/2010 | Okamoto et al. | |
| 7,743,776 B2 | 6/2010 | Okamoto et al. | |
| 7,758,700 B2 | 7/2010 | Fuchigami et al. | |
| 2007/0107752 A1 * | 5/2007 | Fuchigami et al. ............. | 134/21 |
| 2008/0141484 A1 | 6/2008 | Satoh et al. | |
| 2009/0314312 A1 * | 12/2009 | Fuchigami et al. ............... | 134/9 |

FOREIGN PATENT DOCUMENTS

| | | |
|---|---|---|
| JP | 51-25653 | 3/1976 |
| JP | 57-103187 | 6/1982 |
| JP | 63-71154 | 5/1988 |
| JP | 63-196379 | 8/1988 |
| JP | 2515833 | 8/1996 |
| JP | 2791862 | 6/1998 |
| JP | 10-284457 | 10/1998 |

(Continued)

*Primary Examiner* — Saeed T Chaudhry
(74) *Attorney, Agent, or Firm* — Cooper & Dunham LLP

(57) ABSTRACT

A cleaning device (1) performs a cleaning of an article by blowing a cleaning medium (5) by an air stream onto the article (4). The cleaning device (1) includes a cleaning tank (6) that forms a space for the cleaning medium (5) to be blown, which includes an opening; a holding unit (3) that holds the article (4) at the opening; a pool member (19) that is arranged on an outer edge of the opening with a clearance between the pool member (19) and the article (4); and a cleaning-medium collecting unit (8) that brings the cleaning medium (5) leaked out of the outer edge and accumulated in the clearance back into the cleaning tank (6).

13 Claims, 9 Drawing Sheets

(56) References Cited

FOREIGN PATENT DOCUMENTS

| JP | 2004-299042 | 10/2004 |
| JP | 2007-144395 | 6/2007 |
| JP | 2007-29945 | 8/2007 |

* cited by examiner

CLEANING DEVICE AND CLEANING METHOD

TECHNICAL FIELD

The present invention relates to a cleaning device and a cleaning method for removing dusts and foreign matters sticking to an article being cleaned. More particularly, the present invention relates to a technology that is effective at removing flux sticking to a mask jig for use in a soldering process of mounting, on a printed circuit board, an electronic component to be used in various types of electrical equipment or the like.

BACKGROUND ART

In recent years, a soldering process with use of a flow soldering bath in production of a printed circuit board has generally been performed by using a mask jig that masks a target with exception of an area to be soldered. Examples of the mask jig include what is called a dip pallet or a carrier pallet. Such a mask jig has required periodic cleaning because accumulation and affixation of flux onto a surface of the mask jig due to repeated use of the mask jig can deteriorate accuracy of the masking.

Under such a circumstance, a cleaning device that cleans an article being cleaned such as a jig onto which flux, an adhesive material, adhesive, or the like is sticking is provided. The cleaning device squirts solvent onto each of the top and bottom surfaces of the article being cleaned in a solvent cleaning tank, thereafter washes out the solvent adhering to the article being cleaned with water, and blows warm air against the article being cleaned for drying.

However, when an article being cleaned onto which flux or the like is sticking is cleaned with a cleaning device that uses solvent, not only usage of a large amount of solvent but also disposal of waste containing the flux or the like and post-cleaning drying can require a large amount of energy as well as a large environmental load. This requires a large cost, which is a problem.

To this end, a cleaning device that causes cleaning media formed of light-weight, easily-airborne solids to be blown in the air at a high velocity in a cleaning tank is provided. The cleaning media are brought into contact with an article being cleaned successively in a cleaning tank so that the cleaning media remove adherents (dusts, powders, filmy dirt sticking onto the article, or the like) from the article being cleaned without using solvent. Because this cleaning device causes the cleaning media to circulate inside the cleaning tank and come into contact with an article being cleaned repeatedly, a great cleaning effect is exerted even when the cleaning device is of a dry type and uses a small amount of the cleaning media. In particular, when the cleaning media are formed of flexible, thin pieces, the cleaning device can attain a level in cleaning effect equal to or better than that of ultrasonic cleaning even with use of a further small amount of the cleaning media.

In the cleaning device described above, an article to be cleaned is placed inside a cleaning tank to receive cleaning media that strike the article to be cleaned. Accordingly, it is required of the cleaning tank to have a capacity equal to or greater than the article to be cleaned.

However, when the cleaning tank is upsized, it becomes difficult to cause the cleaning media to be airborne rather than reside inside the cleaning tank. As a result, the number of times when the cleaning media strike the article being cleaned decreases, and cleaning effect is impaired, which is a problem. This has made it difficult to adapt the cleaning device for cleaning of a large article to be cleaned.

The apparatus disclosed in Patent Document 1 performs cleaning by causing water jet squirted from a nozzle to impinge on an article being cleaned while pressing a leading end of a casing that houses the nozzle therein against the article being cleaned for sealing. Water having been used in cleaning is recovered without leaking to the outside by moving the casing along the article being cleaned.

An apparatus that performs cleaning of a window pane or the like is disclosed in Patent Document 2. A sealing member is arranged to surround a cleaning device body. During cleaning of a window pane, the sealing member is detached from the window pane to define a clearance between the window pane and the sealing member. Air in the clearance is drawn into the cleaning device body and an air stream is generated in the clearance. Cleaning fluid is supplied to the brush in this state to clean the window pane, and the cleaning fluid and cleaned dirt are collected by the air stream.

Patent document 1: Japanese Patent Application Laid-open No. 2004-299042

Patent document 2: Japanese Patent Publication No. S51-25653

However, the cleaning device disclosed in Patent Document 1 is disadvantageous in that, when the cleaning device uses thin-piece cleaning media, the cleaning media can pile up and be caught in a clearance at or near an opening of the cleaning tank like a scaly structure. The caught cleaning media creates a clearance by lifting up a sealing member. This can cause a problem that the cleaning media leak out of a space where the cleaning media are to be blown. When an amount of the cleaning media is undesirably reduced by such leakage, the number of times when the cleaning media strike the article being cleaned decreases, leading to an undesirable result that cleaning effect substantially decreases.

When an article being cleaned by the cleaning device disclosed in Patent Document 2 has an uneven surface, the size of the clearance between the article being cleaned and the sealing member varies due to the uneven surface. Because this variation causes the air stream to become unstable, the cleaning media can leak to the outside. When a cleaning device that causes cleaning media to circulate in the cleaning tank is employed, this leakage of the cleaning media reduces an amount of the cleaning media to be blown in the air. This leads to a problem that the number of times when the cleaning media strike the article being cleaned decreases, and cleaning effect is reduced.

The present invention has been achieved to solve the above circumstances and it is an object of the present invention to provide a cleaning device and a cleaning method capable of effectively cleaning an article being cleaned even when the article being cleaned has a complicated surface profile as well as achieving downsizing of a cleaning tank. This object is attained by positioning the article being cleaned outside the cleaning tank and causing cleaning media to be blown in the air rather than reside inside the cleaning tank.

It is another object of the present invention to prevent leakage of the cleaning media and cause the cleaning media to immediately return to the space where the cleaning media are to be blown so that the number of the cleaning media that strike the article being cleaned is maintained and stable cleaning performance is maintained.

DISCLOSURE OF INVENTION

To solve the above problems and to achieve the object, according to one aspect of the present invention, there is provided a cleaning device that performs a cleaning of an article by blowing a cleaning medium by an air stream onto the article. The cleaning device includes a cleaning tank that forms a space for the cleaning medium to be blown, which includes an opening; a holding unit that holds the article at the opening; a pool member that is arranged on an outer edge of the opening with a clearance between the pool member and the article; and a cleaning-medium collecting unit that brings the cleaning medium leaked out of the outer edge and accumulated in the clearance back into the cleaning tank.

Furthermore, according to another aspect of the present invention, there is provided a method of cleaning an article by blowing a cleaning medium by an air stream onto the article. The method includes generating an air stream in a cleaning tank while sucking air from inside the cleaning tank; cleaning an article that is placed at an opening of the cleaning tank by blowing the cleaning medium in air; and collecting the cleaning medium accumulated in a clearance between the article and a pool member that is arranged on an outer edge of the opening back into the cleaning tank.

BEST MODES FOR CARRYING OUT THE INVENTION

Exemplary embodiments of a cleaning device and a cleaning method according to the present invention are described in detail below with reference to the accompanying drawings. The present invention is not limited to these exemplary embodiments.

Figure 1A:
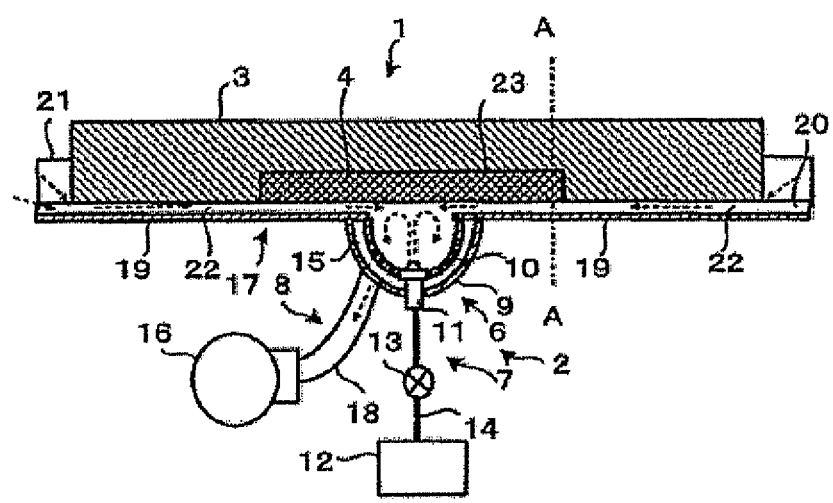
FIG. 1A is a schematic front cross-sectional view depicting a functional configuration of a cleaning device.
Figure 1B:
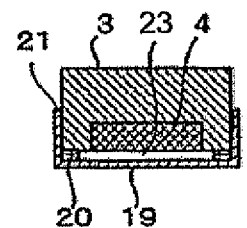
FIG. 1B is a schematic cross-sectional view, taken along a line A-A of FIG. 1A, depicting the functional configuration of the cleaning device.
Figure 1C:
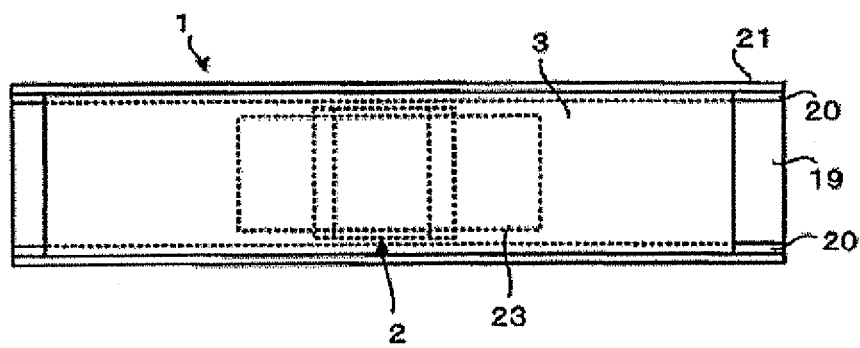
FIG. 1C is a schematic top view depicting the functional configuration of the cleaning device.
Figure 2A:
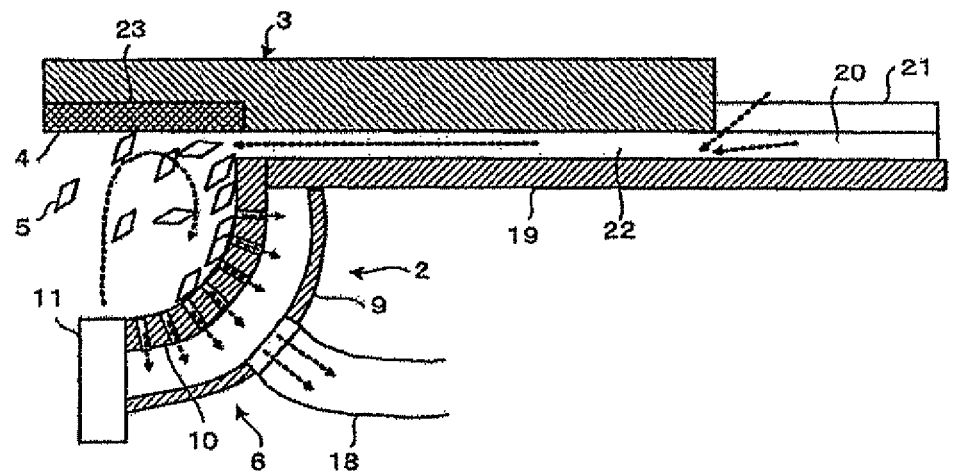
FIG. 2A is a partially enlarged cross-sectional view depicting relevant portions of the cleaning device.
Figure 2B:
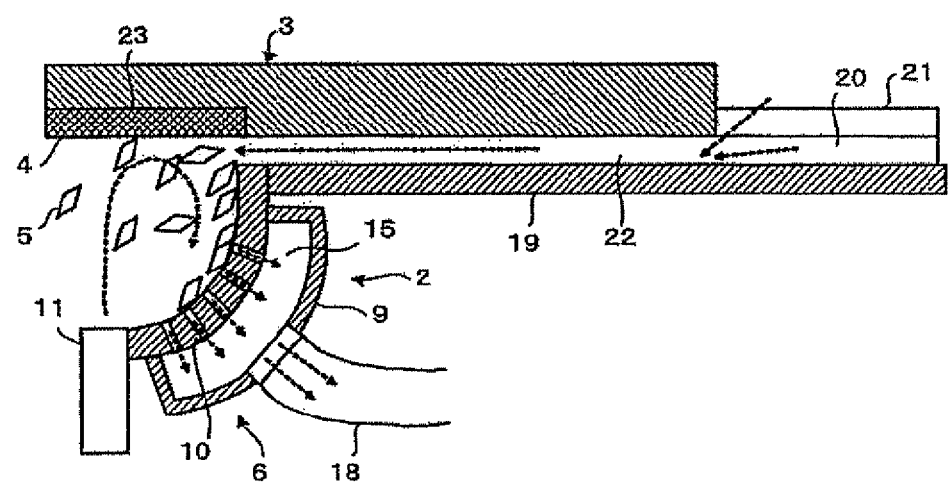
FIG. 2B is a partially enlarged cross-sectional view depicting relevant portions of the cleaning device.

FIGS. 1A, 1B, and 1C depict a configuration of a cleaning device 1 according to the present invention. FIG. 1A is a schematic front cross-sectional view. FIG. 1B is a schematic cross-sectional view taken along a line A-A of FIG. 1A. FIG. 1C is a schematic top view. The cleaning device 1 includes a cleaning tank unit 2, a holding unit 3, and a pool member 19. FIGS. 2A and 2B are enlarged cross-sectional views of the cleaning device 1. FIG. 2A depicts removal of adherents sticking to an article 4 that is held by the holding unit 3. The removal is achieved by causing a cleaning medium 5 that is blown in the air by air stream to strike the article 4.

The cleaning medium 5 for use in the cleaning device 1 is, for example, hard, durable-to-shock material such as polycarbonate or polyethylene terephthalate. The cleaning medium 5 can be thin, square pieces each of which is 0.1 millimeter to 0.2 millimeter in thickness and 5 millimeters to 10 millimeters in length on each side. In the present embodiment, the cleaning medium 5 of the thickness and the size is used; however, the size and the thickness are not limited thereto, and it is effective to change the size and the material depending on the article 4.

When a force of an air stream exerted on the cleaning medium 5, which is formed with thin pieces, in a direction in which the cleaning medium 5 receives the air stream at a large area, the cleaning medium 5 is easily accelerated to be blown in the air. This is because a mass of the cleaning medium 5 is substantially small relative to an air resistance force on the cleaning medium 5. In contrast, when an air stream flows in a direction in which the cleaning medium 5 receives the air stream at a small area, an air resistance force on the cleaning medium 5 is small. Hence, the cleaning medium 5 that is blown in the air in this direction keep moving at a high velocity for a long period of time. Because the cleaning medium 5 thus has high energy, the cleaning medium 5 exerts a great force on the article 4 upon contacting the article 4. Accordingly, the cleaning medium 5 can remove adherents sticking to the article 4 effectively. Furthermore, because the cleaning medium 5 is repeatedly circulated to increase frequency of contacts with the article 4, cleaning efficiency can be increased.

Because the air resistance force on the cleaning medium 5 varies substantially depending on an attitude of the cleaning medium 5, the cleaning medium 5 is brought into contact with the article 4 repeatedly not only by movements along an air stream but also by complicated movements of the cleaning medium 5. Examples of the complicated movements include abrupt change in a traveling direction of the cleaning medium 5. These repeated contacts further increase cleaning efficiency for the article 4 that has a complicated surface profile.

The cleaning tank unit 2 includes a cleaning tank 6, a cleaning-medium accelerating unit 7, and a cleaning-medium collecting unit 8. The cleaning tank 6 has a cleaning tank body 9 and a separating member 10. The cleaning tank body 9 can be a rectangular solid, a pyramid, or a semi-cylinder of which opposite ends are sealed. The cleaning tank body 9 has an opening on an upper side. The separating member 10 has a large number of small holes or slits, through which gas, powdery dusts, and the like can pass but the cleaning medium 5 cannot. The separating member 10 can be a porous member such as a wire net, a plastic net, a mesh, a perforated metal, or a plate having slits. The separating member 10 has a smooth shape (e.g., a semi-cylindrical shape) that will not cause the cleaning medium 5 to be accumulated therein. The separating member 10 is arranged inside the cleaning tank 6 so as to have a predetermined clearance between the cleaning tank body 9 and the separating member 10.

The cleaning-medium accelerating unit 7 includes a cleaning-medium accelerating nozzle 11 and a compressed-air supplying unit 12. The cleaning-medium accelerating nozzle 11 has a plurality of nozzle holes. The compressed-air supplying unit 12 includes a compressor. The nozzle holes in the cleaning-medium accelerating nozzle 11 are aligned on a center line of the bottom surface of the cleaning tank body 9. The cleaning-medium accelerating nozzle 11 extends through the cleaning tank body 9 and the separating member 10. The compressed-air supplying unit 12 supplies compressed air to the cleaning-medium accelerating nozzle 11 via an air supply pipe 14 to cause the cleaning medium 5 to be blown in the air. The air supply pipe 14 has a regulating valve 13.

The cleaning-medium collecting unit 8 includes a suction duct 15 and a suction unit 16. The cleaning-medium collecting unit 8 generates cleaning medium-decelerating air streams 17 in clearances 22 between the pool member 19 and the article 4 held by the holding unit 3. The pool member 19 is arranged to define the clearances 22. The suction unit 16 sucks air via a suction pipe 18 from inside the cleaning tank body 9. The suction duct 15 is a passage of air, dusts, and the like that are sucked into the suction duct 15 via the separating member 10. The suction unit 16 is capable of developing a negative pressure inside the cleaning tank body 9 because the suction unit 16 has a sufficiently large suction power relative to an amount of air discharged from the cleaning-medium accelerating nozzle 11. As shown in FIG. 2B, the cleaning tank 6 can have an opening, to which the separating member 10 can be fixed, in a portion of its internal surface so that the suction duct 15 is arranged independently outside the separating member 10.

Side surface guides 21 and the pool member 19 that form a channel shape and have a predetermined length are arranged on each of opposite sides of the cleaning tank body 9. The upper surface of the pool member 19 extends generally horizontally. The pool member 19 has linear guides 20 at corners of the upper surface. Each of the linear guides 20 is a rectangular column that is, for example, 5 millimeters in thickness. The surface of the linear guide 20 is made of a smooth material such as fluorocarbon resin. The pool member 19 holds the holding unit 3 and guides movement of the holding unit 3 together with the side surface guides 21, which are parallel to each other. The requirement for the size, which depends on the linear guides 20, of the clearance 22 between the upper surface of the pool member 19 and the holding unit 3 is that the cleaning medium 5 is not caught in the clearance 22 and a velocity of an air stream flowing into the clearance 22 is sufficiently high. Any condition appropriate for the size of the cleaning medium 5 can be employed so long as the requirement is satisfied.

The holding unit 3 is planar and longer than the article 4. The holding unit 3 includes, at its center, an article holding portion 23. The article holding portion 23 is a hollow of a shape that conforms to a shape of the article 4. A component of the article holding portion 23 is made of elastic material such as urethane rubber or resin foam to hold the article 4 by friction. The article holding portion 23 for holding the article 4 can be constructed arbitrarily so long as the article holding portion 23 has no clearance through which an air stream for use in cleaning by using the cleaning medium 5 can leak and in which the cleaning medium 5 can be caught.

The holding unit 3 is removably connected to a drive unit, which is not shown, such as a linear motion motor, an air cylinder, or a cable drive. The holding unit 3 is moved along the pool member 19 by the drive unit according to control signals sent from a control device, which is not shown, in parallel with operations performed by the cleaning tank unit 2. The pool member 19 has an area equal to or greater than a moving area of the article 4 held by the holding unit 3.

A series of operations performed by the cleaning device 1 to remove adherents sticking to the article 4 will be described below.

Figure 3A:
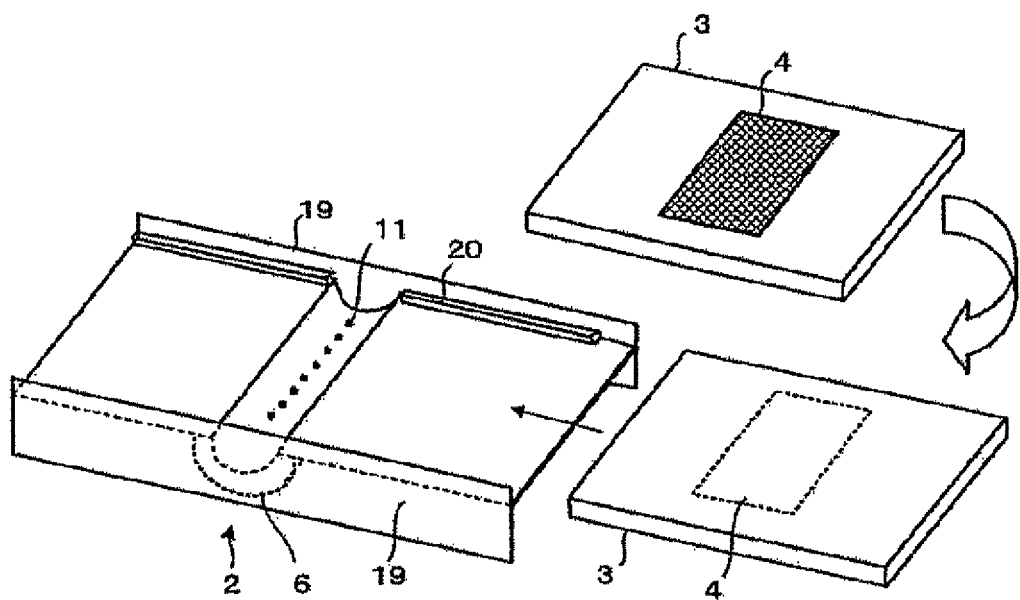
FIGS. 3A and 3B are schematic diagrams of the cleaning device to which an article is fixed.
Figure 3B:
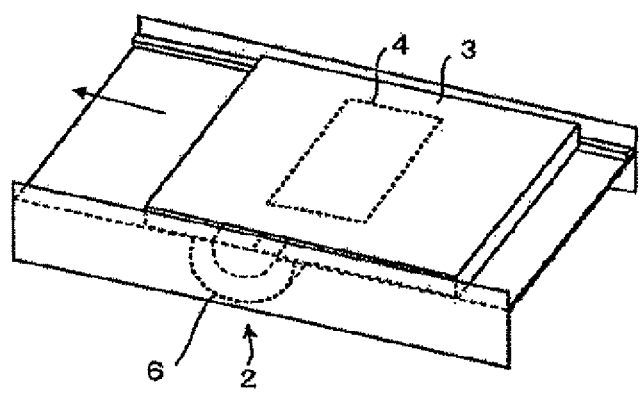

The cleaning medium 5 is placed in the cleaning tank 6. The article 4 is placed in the article holding portion 23 of the holding unit 3 as shown in FIG. 3A. After the article 4 is arranged so as to face the cleaning tank unit 2, the holding unit 3 is placed on the cleaning tank unit 2. The holding unit 3 is connected to the drive unit, which is not shown, and moved so as to be located above the cleaning tank 6 as shown in FIG. 3B. As a result, a space where the cleaning medium 5 is to be blown is defined between the article 4 and the cleaning tank 6. When the control device, which is not shown, activates the suction unit 16 in this state, air in the space where the cleaning medium 5 is to be blown is sucked. This suctioning of air from the space where the cleaning medium 5 is to be blown develops a pressure difference between inside and outside of the space. Consequently, air streams that flow through the clearances 22 between the pool member 19 and the holding unit 3 toward the inside of the space where the cleaning medium 5 is to be blown are generated. These air streams become laminar flows while passing along the flat surface of the pool member 19, and introduce outside air into the cleaning tank 6.

Next, the control device, which is not shown, activates the compressed-air supplying unit 12 to open the regulating valve 13 so that compressed air is supplied to the cleaning-medium accelerating nozzle 11. The compressed air is discharged from the cleaning-medium accelerating nozzle 11 to generate a vertically upward air stream inside the cleaning tank 6. As shown in FIG. 2A, this air stream causes the cleaning medium 5 to be blown in the air and strike the article 4, so that dirt, dusts, and the like sticking to the surface of the article 4 are removed efficiently. After striking the article 4, the cleaning medium 5 travels downward by a flow of the air stream and the pull of gravity, and fall onto a portion near the cleaning-medium accelerating nozzle 11 in a sliding manner while being sucked on or above the separating member 10. Simultaneously, adherents sticking to the article 4 are sucked. The adherents that are separated by the separating member 10 are collected into the suction unit 16 through the suction duct 15 and the suction pipe 18. The cleaning medium 5 fallen onto the portion near the cleaning-medium accelerating nozzle 11 is again lifted vertically upward by an air stream discharged from the cleaning-medium accelerating nozzle 11. By repeating these operations, adherents sticking onto the surface of the article 4 are removed.

While the article 4 is cleaned with the cleaning medium 5, air streams flow into the cleaning tank 6 through the clearances 22 between the pool member 19 and the holding unit 3. Hence, because these air streams push the cleaning medium 5 back toward inside the space where the cleaning medium 5 is to be blown, leakage of the cleaning medium 5 out of the cleaning device 1 is prevented. In addition, even when some of the cleaning medium 5 enters the clearance 22, because the flow path in the clearance 22 is sufficiently long to decelerate the cleaning medium 5 in the clearance 22. Accordingly, the cleaning medium 5 eventually falls on the pool member 19 rather than leak out of the cleaning device 1.

When the cleaning medium 5 is to be blown by using the cleaning-medium accelerating nozzle 11 to clean the article 4, air stream is intermittently discharged from the cleaning-medium accelerating nozzle 11 by intermittently operating the regulating valve 13. During a period when the air stream is intermittently discharged, a condition where a pressure difference between inside and outside of the cleaning tank 6 is large occurs. Under this condition, the cleaning medium 5 fallen on the pool member 19 can be brought back into the space where the cleaning medium 5 is to be blown more reliably.

In parallel with the intermittent operation of the regulating valve 13, the control device causes the holding unit 3 to reciprocate along the side surface guides 21 of the pool member 19 and the linear guides 20 to clean the article 4. The control device causes the holding unit 3 to make at least one cycle of a to-and-fro movement. Thereafter, the control device stops operations of the compressed-air supplying unit 12 and the suction unit 16 to complete the series of the cleaning operations.

By reciprocating the holding unit 3 relative to the cleaning tank 6, the article 4 can be reliably cleaned even when a surface of the article 4 is large.

Figure 4:
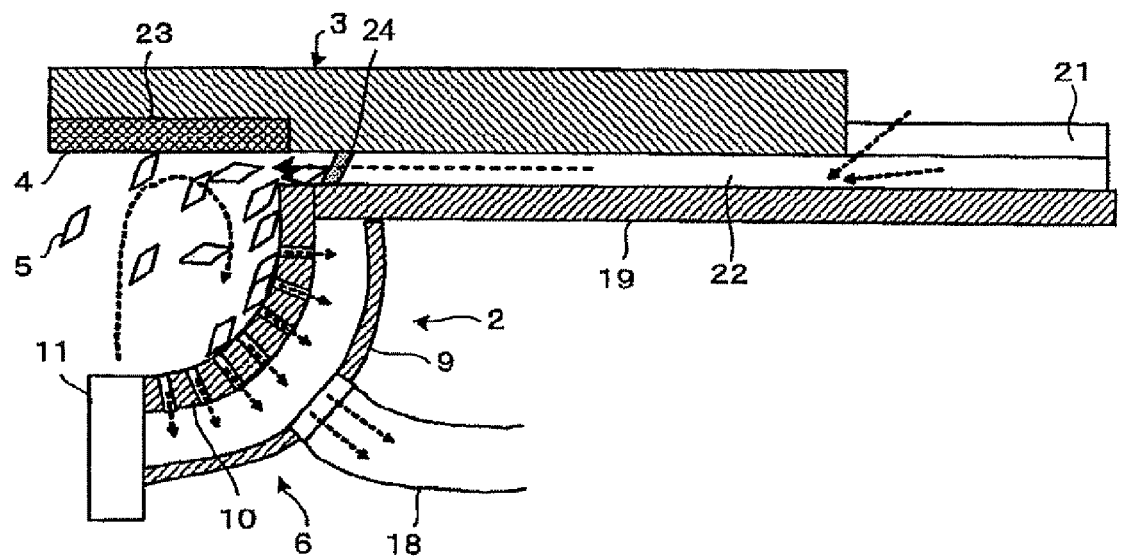
FIG. 4 is a partially enlarged cross-sectional view of the cleaning device that includes a scraper member on a holding unit.

Heretofore, the configuration in which air is sucked from inside the cleaning tank 6 to generate air streams in the clearances 22 between the pool member 19 and the holding unit 3 to prevent entry of the cleaning medium 5 into the clearances 22 and return the cleaning medium 5 back into the space where the cleaning medium 5 is to be blown has been described. However, the holding unit 3 can further include scraper members 24 as shown in FIG. 4 near the article holding portion 23 such that the article holding portion 23 is between the scraper members 24 along a traveling direction of the holding unit 3 relative to the cleaning tank 6. The scraper members 24 are driven by a motor or a cylinder to open and close the clearances 22. In the configuration in which the article holding portion 23 is between the scraper members 24 in this manner, when the control device causes the holding unit 3 to intermittently reciprocate in the traveling direction relative to the cleaning tank 6, the scraper members 24 come into contact with the pool member 19. Accordingly, the scraper members 24 sweepingly collect the cleaning medium 5 remaining in the clearances 22 and put the cleaning medium 5 back into the cleaning tank 6 without fail.

Figure 5:
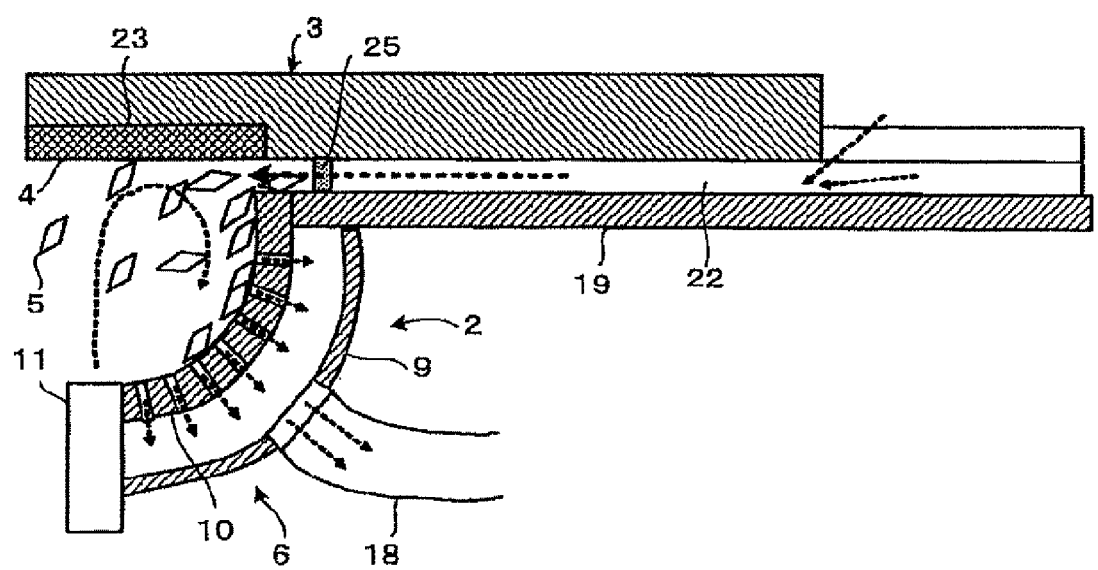
FIG. 5 is a partially enlarged cross-sectional view of the cleaning device that includes an air-permeable scraper member on the holding unit.

As shown in FIG. 5, air-permeable scraper members 25 formed of a perforated metal, a resin plate with slits, a flexible film, a flexible rubber plate, or a brush can be used in place of the scraper members 24 that open and close the clearance 22. In the configuration that includes the air-permeable scraper members 25 that are connected to the article 4 and driven to sweepingly collect the cleaning medium 5 on the pool member 19, the cleaning medium 5 is immediately returned into the space where the cleaning medium 5 is to be blown irrespective of whether the article 4 has a complicated surface profile. Hence, the amount of the cleaning medium 5 to be blown in the air can be maintained.

Figure 6A:
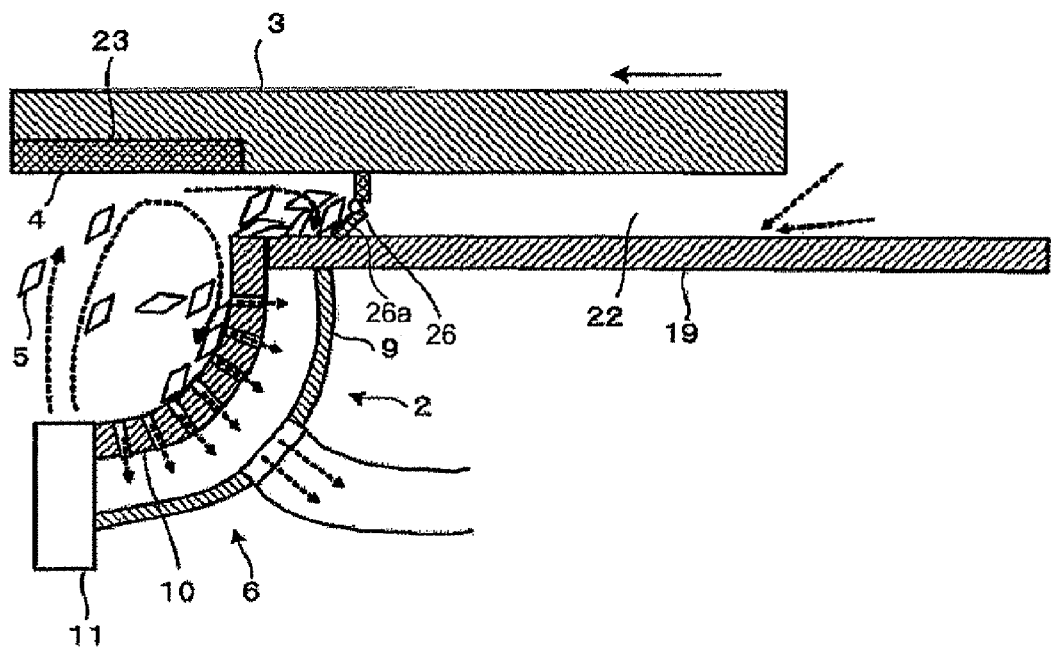
FIG. 6A is a partially enlarged cross-sectional view of the cleaning device that includes, on the holding unit, a scraper member that includes a flap valve.
Figure 6B:
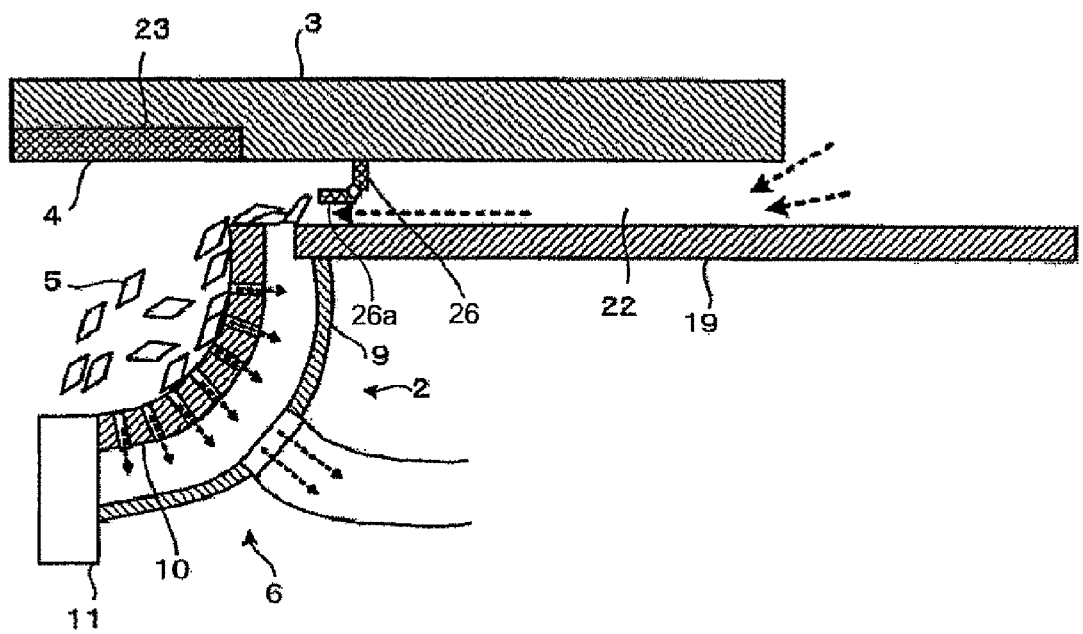
FIG. 6B is a partially enlarged cross-sectional view of the cleaning device that includes, on the holding unit, the scraper member that includes the flap valve.

As shown in FIGS. 6A and 6B, scraper members 26 each of which includes, at its lower portion, a flap valve 26a that is opened and closed by an air stream can be provided as the scraper members 24. As shown in FIG. 6A, while air streams are discharged from the cleaning-medium accelerating nozzle 11, the scraper member 26 that includes the flap valve 26a closes the flap valve 26a to block the cleaning medium 5 that is blown in the air to prevent leakage of the cleaning medium 5 out of the cleaning device 1. When air streams discharged from the cleaning-medium accelerating nozzle 11 are stopped and a negative pressure is built up inside the cleaning tank 6, the flap valve 26a is opened. As a result, air streams that flow into the clearance 22 bring the cleaning medium 5 blocked by the flap valve 26a back to the inside of the cleaning tank 6 for reuse in cleaning.

In place of the flap valve 26a that is to be opened and closed by an air stream, a shutter mechanism that is driven by a drive unit such as an air cylinder or a motor can be employed. The control device can control the shutter mechanism such that the shutter mechanism is closed when an air stream is being discharged from the cleaning-medium accelerating nozzle 11 while the shutter mechanism is open when an air stream is not being discharged from the cleaning-medium accelerating nozzle 11.

Figure 7:
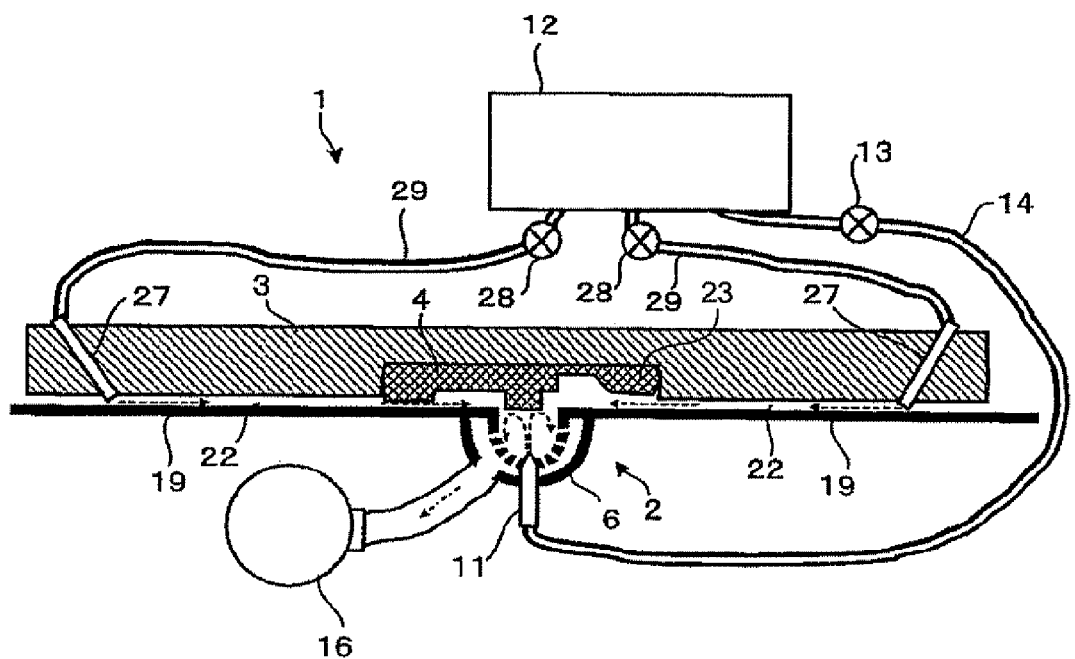
FIG. 7 is a partially enlarged cross-sectional view of the cleaning device that includes leakage-preventing-flow generating nozzles.

In the above description, the air streams that are generated in the clearances 22 between the pool member 19 and the holding unit 3 by the suction unit 16 that sucks air from inside the cleaning tank 6 have been explained. Alternatively, as shown in FIG. 7, leakage-preventing-flow generating nozzles 27 can be connected to the holding unit 3. In this case, while the suction unit 16 sucks air from inside the cleaning tank 6, the compressed-air supplying unit 12 supplies compressed air via air supply pipes 29 so that air streams are generated in the clearances 22 between the pool member 19 and the holding unit 3 with air discharged from the leakage-preventing-flow generating nozzles 27. Each of the air supply pipes 29 includes a regulating valve 28. The air streams generated in the clearances 22 can prevent entry of the cleaning medium 5 into the clearances 22 more reliably.

Figure 8A:
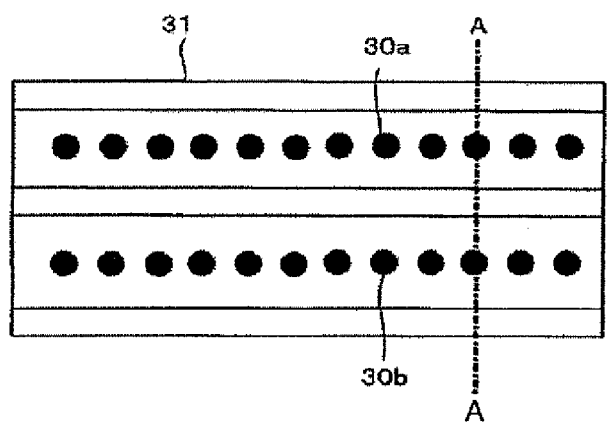
FIG. 8A is a schematic top view depicting a configuration of a cleaning-media-accelerating-direction regulating nozzle.
Figure 8B:
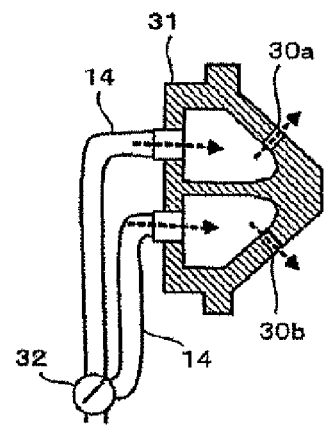
FIG. 8B is a schematic cross-sectional view, taken along a line A-A of FIG. 8A, depicting the configuration of the cleaning-media-accelerating-direction regulating nozzle.

Heretofore, the configuration in which the cleaning-medium accelerating nozzle 11 generates an air stream directed vertically upward has been described. A cleaning medium-accelerating-direction regulating nozzle 31 can include two nozzle hole groups, i.e., a nozzle hole group 30a and a nozzle hole group 30b, as shown in FIG. 8A, which is a top view, and in FIG. 8B which is a cross-sectional view taken along a line A-A. The nozzle hole group 30a is inclined in one direction along the traveling direction of the holding unit 3 at a predetermined angle relative to the vertically upward direction. The nozzle hole group 30b is inclined in the other direction along the traveling direction at a predetermined angle relative to the vertically upward direction. Compressed air can be supplied to the two nozzle hole groups 30a and 30b in a switching manner by using a switch valve 32.

Figure 9A:
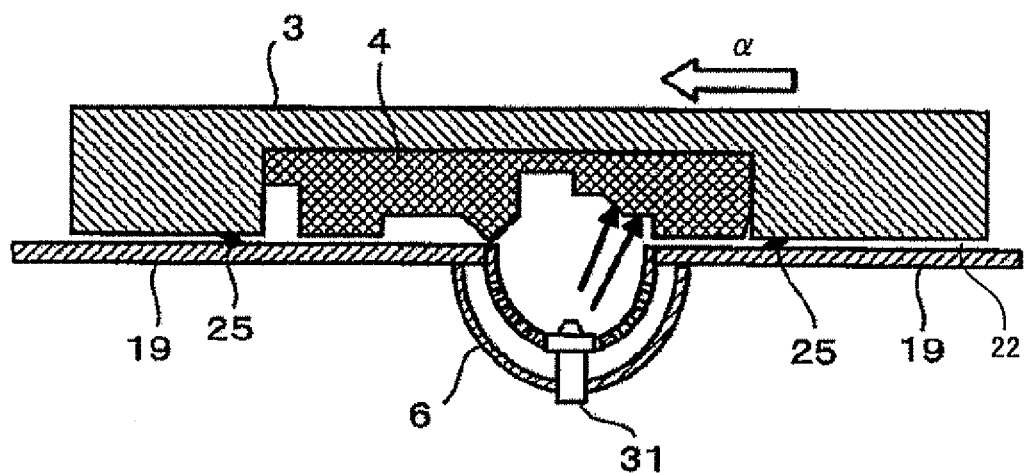
FIG. 9A is a schematic front cross-sectional view depicting air streams discharged from the cleaning-media-accelerating-direction regulating nozzle.
Figure 9B:
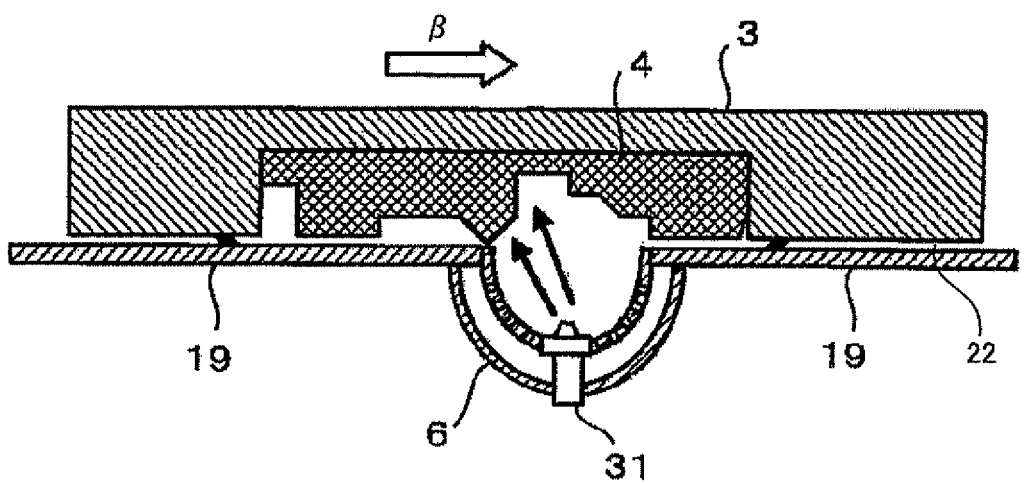
FIG. 9B is a schematic front cross-sectional view depicting air streams discharged from the cleaning-media-accelerating-direction regulating nozzle.

As shown in FIGS. 9A and 9B, in the configuration that includes the cleaning medium-accelerating-direction regulating nozzle 31, the control device operates the switch valve 32 at regular intervals during the course where the cleaning medium 5 is blown by the air stream to clean the article 4 held by the holding unit 3 so that a discharging direction of an air stream is changed along the traveling direction of the holding unit 3. By this operation, an impinging position where the cleaning medium 5 strikes the article 4 can be varied. Hence, even when the article 4 has a complicated surface profile, every corner of the profile can be cleaned without fail by changing at regular intervals the impinging position of the cleaning medium 5. Furthermore, when a control operation is performed such that a direction in which the holding unit 3 moves and a direction in which the cleaning medium 5 is accelerated constantly oppose to each other, the air-permeable scraper members 25 arranged on the holding unit 3 push out the cleaning medium 5 caught in the clearances 22 between the pool member 19 and the holding unit 3 into the space where the cleaning medium 5 is to be flown. By this control operation, the cleaning medium 5 can be prevented from being caught and remain in the clearances 22.

Figure 10A:
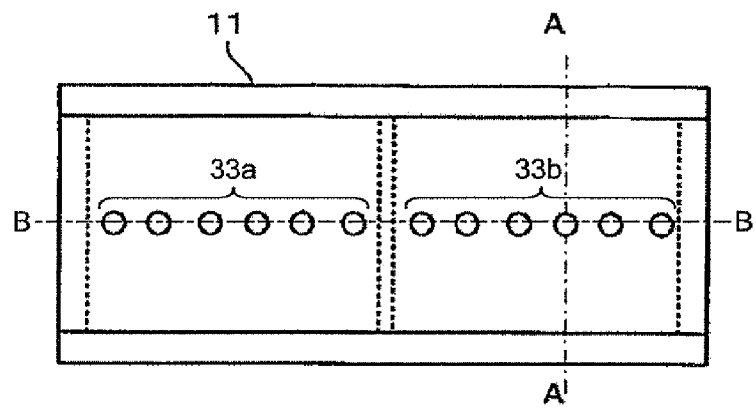
FIG. 10A is a schematic top view depicting a configuration of a cleaning-media-accelerating-direction regulating nozzle that includes two nozzle hole groups, i.e., a left nozzle hole group and a right nozzle hole group.
Figure 10B:
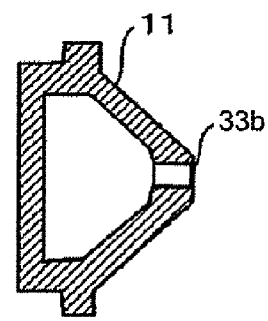
FIG. 10B is a schematic cross-sectional view, taken along a line A-A of FIG. 10A, depicting the configuration of the cleaning-media-accelerating-direction regulating nozzle that includes the two nozzle hole groups, i.e., the left nozzle hole group and the right nozzle hole group.
Figure 10C:
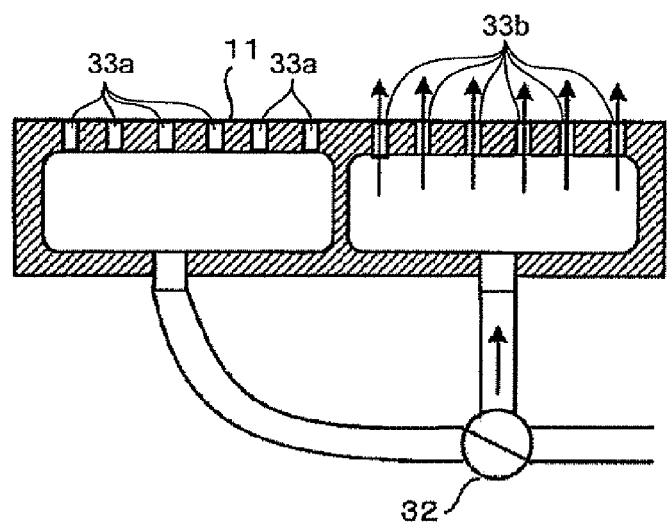
FIG. 10C is a schematic cross-sectional view, taken along a line B-B of FIG. 10A, depicting the configuration of the cleaning-media-accelerating-direction regulating nozzle that includes the two nozzle hole groups, i.e., the left nozzle hole group and the right nozzle hole group.
Figure 11:
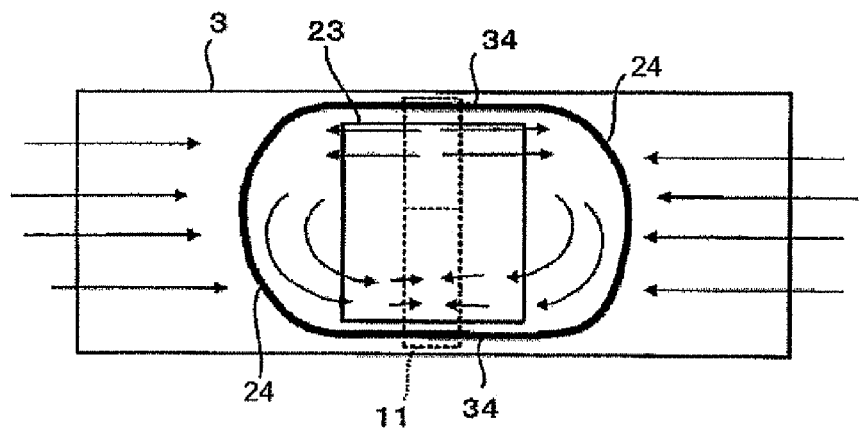
FIG. 11 is a schematic top view depicting arcuate scraper members arranged on the holding unit.

As shown in FIG. 10A, FIG. 10B, and FIG. 10C, the cleaning-medium accelerating nozzle 11 can be internally partitioned into a right section and a left section that are arranged side by side in a lengthwise direction. The lengthwise direction is perpendicular to the traveling direction of the holding unit 3. The left section includes a nozzle hole group 33a, and the right section includes a nozzle hole group 33b. With the configuration in which the cleaning-medium accelerating nozzle 11 includes the nozzle hole groups 33a and 33b of the left section and the right section, each of the scraper members 24 is arranged in an arc on the holding unit 3 as shown in FIG. 11.

With the configuration in which each of the scraper members 24 is arranged in an arc when an air stream is alternately discharged from the nozzle hole groups 33a and 33b at regular intervals, air streams discharged from the one nozzle hole group 33a flow along air-stream guide members 34 and the arcuate scraper members 24. These air streams flowing along the arcuate scraper members 24 form flow paths returning to the cleaning tank 6, bringing the cleaning medium 5 struck the article 4 back into the cleaning tank 6. Accordingly, the cleaning medium 5 is brought back into the space where the cleaning medium 5 is to be blown without fail for reuse rather than leak out of the cleaning device 1. As a result, cleaning performance can be stabilized.

Figure 12:
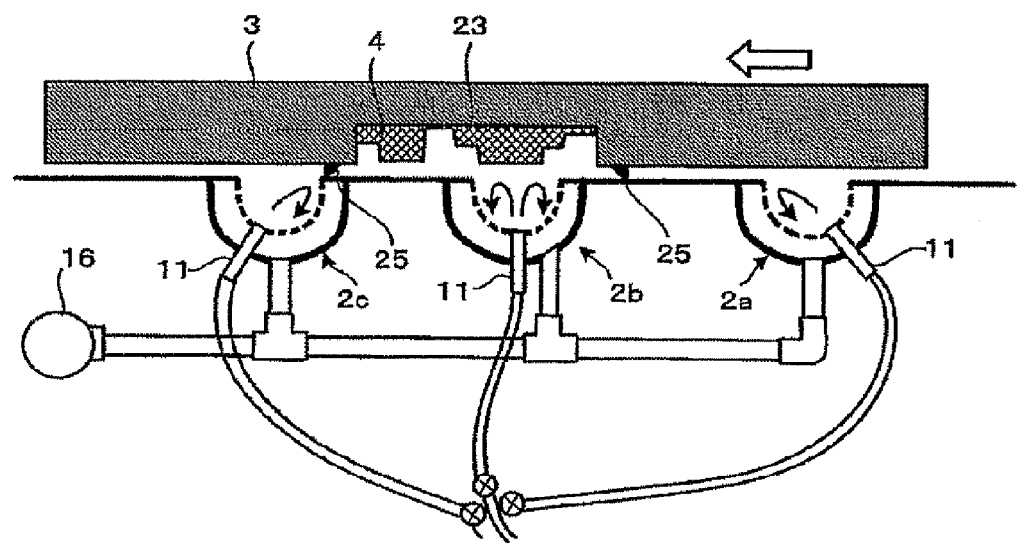
FIG. 12 is a schematic configuration diagram of the cleaning device that includes a plurality of cleaning tank units that is linearly aligned.

The configuration in which the cleaning device 1 includes one cleaning tank unit 2 has been described. FIG. 12 depicts another configuration in which the cleaning device 1 includes, for example, three cleaning tank units 2a to 2c that are linearly aligned. In this case, the cleaning tank units 2a to 2c are linearly aligned such that each of the cleaning tank units 2a to 2c independently performs cleaning in cooperation with the air-permeable scraper members 25. In FIG. 12, the cleaning tank units 2a to 2c are arranged at regular intervals along the traveling direction of the holding unit 3. Discharging directions of air streams from the cleaning-medium accelerating nozzles 11 differ from one another relative to the traveling direction of the holding unit 3. For example, a discharging direction of an air stream from the cleaning-medium accelerating nozzle 11 in the cleaning tank unit 2a can be 60 degrees relative to the traveling direction of the holding unit 3; a discharging direction of an air stream from the cleaning-medium accelerating nozzle 11 in the cleaning tank unit 2b can be 90 degrees relative to the traveling direction of the holding unit 3; and a discharging direction of an air stream from the cleaning-medium accelerating nozzle 11 in the cleaning tank unit 2c can be 120 degrees relative to the traveling direction of the holding unit 3. When the holding unit 3 that holds the article 4 is moved from a position near the cleaning tank unit 2a to reach a position corresponding to the cleaning tank units 2a to 2c, air streams are discharged from the cleaning-medium accelerating nozzles 11 in the cleaning tank units 2a to 2c. Hence, the cleaning medium 5 is blown in the air to clean the article 4.

With this arrangement in which the cleaning device 1 includes the cleaning tank units 2a to 2c, the cleaning medium 5 is blown in directions that differ depending on the cleaning tank units 2a to 2c to clean the article 4. Accordingly, even when the article 4 has a complicated surface profile, the cleaning medium 5 impinges on the article 4 at different angles. Hence, the article 4 can be uniformly cleaned. When the cleaning device 1 includes a sufficient number of the cleaning tank units 2, as a matter of course, the need of reciprocating the holding unit 3 is eliminated. When the number of the cleaning tank units 2 is sufficient, it becomes possible to perform cleaning by using a plurality of the holding units 3 each holding the article 4. This enables cleaning of a plurality of the articles 4 in a relatively short period of time.

Figure 13A:
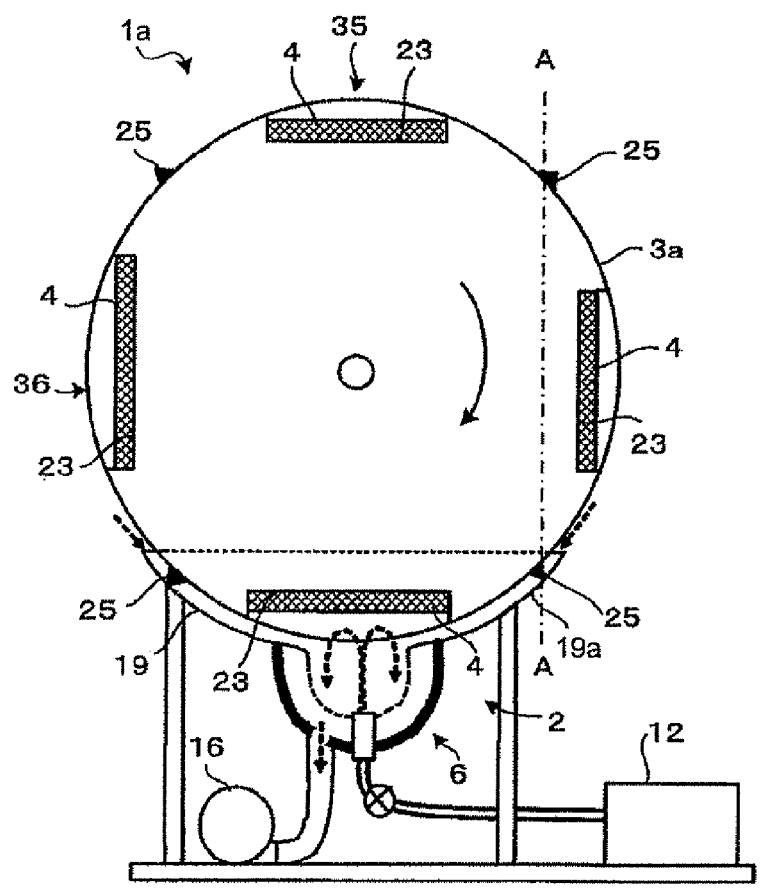
FIG. 13A is a schematic front view depicting a configuration of a cleaning device that includes a rotary holding unit.
Figure 13B:
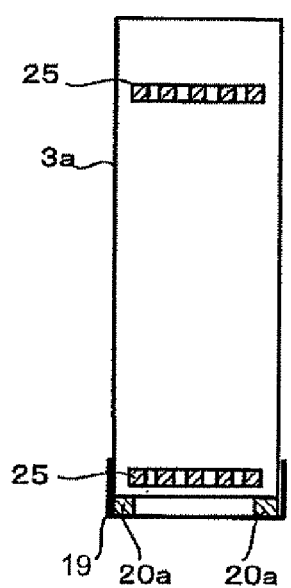
FIG. 13B is a schematic cross-sectional view, taken along a line A-A of FIG. 13A, depicting the configuration of the cleaning device that includes the rotary holding unit.

A cleaning device 1a that includes a rotary holding unit 3a will be described with reference to FIGS. 13A and 13B. As shown in FIGS. 13A and 13B, which is a schematic cross-sectional view taken along a line A-A of FIG. 13A, the cleaning tank unit 2 of the cleaning device 1a includes the pool member 19, which is semi-cylindrical-shaped. As shown in FIG. 13B, the pool member 19 includes, at its interior corners, a pair of arcuate guides 20a. The holding unit 3a has a cylindrical shape and includes article holding portions 23 at circumferentially and equally spaced positions of the holding unit 3a. For example, the article holding portions 23 can be arranged at regular angular intervals of 90 degrees. The holding unit 3a includes the air-permeable scraper members 25 near each of the article holding portions 23. The holding unit 3a is driven by a motor, which is not shown.

A predetermined amount of the cleaning medium 5 is placed in the cleaning tank 6 of the cleaning device 1a. The article 4 is fixed to each of the article holding portions 23 of the holding unit 3a at an article loading position 35. The holding unit 3a rotates in a clockwise direction. When one of the articles 4 reaches the cleaning tank unit 2 by this rotation, the cleaning tank unit 2 is driven to suck air from inside the cleaning tank 6, and an air stream is discharged from the cleaning-medium accelerating nozzle 11 so that the cleaning medium 5 is blown to clean the article 4. During a period over which the article 4 is cleaned, the holding unit 3a can be rotated alternately clockwise and counterclockwise as required to clean an overall surface of the article 4. When cleaning of the article 4 is completed, the cleaning-medium accelerating nozzle 11 stops discharging of air stream. Air suctioning from inside the cleaning tank 6 is stopped, and the holding unit 3a is rotated clockwise. When the article holding portion 23 reaches an article retrieving position 36, it is possible to take out the article 4. These operations are repeated to clean the articles 4.

Components disassembled from a used apparatus that is collected from a customer can be cleaned by using the cleaning device 1. Accordingly, it is possible to utilize the components as a recycled apparatus by reassembling the cleaned components to reconstruct the apparatus.

INDUSTRIAL APPLICABILITY

As set forth hereinabove, a cleaning device and a cleaning method according to the present invention are effective at removing dusts or foreign matters sticking to an article being cleaned, in particular suitable for removing flux sticking to a mask jig for use in a soldering process of mounting, on a printed circuit board, an electronic component to be used in various types of electrical apparatuses or the like.

The invention claimed is:

1. A cleaning device that performs a cleaning of an article by blowing a cleaning medium by an air stream onto the article, the cleaning device comprising:
   a cleaning tank that forms a space for the cleaning medium to be blown, the cleaning tank including an opening;
   a holding unit that holds the article at the opening;
   a pool member that is arranged on an outer edge of the opening with a clearance between the pool member and the article and that has a flat surface which forms the clearance; and
   a cleaning-medium collecting unit that is arranged on the holding unit and includes a scraper member, the scraper member configured to sweepingly collect and bring the cleaning medium leaked out of the outer edge and accumulated on the pool member back into the cleaning tank.

2. The cleaning device according to claim 1, wherein
   the holding unit is movable along the pool member, and
   the pool member has an area equal to or larger than a moving area of the article held by the holding unit.

3. The cleaning device according to claim 1, wherein the cleaning-medium collecting unit generates an air stream that is directed toward the cleaning tank in the clearance.

4. The cleaning device according to claim 1, further comprising a separating member that faces the space and separates an adherent sticking to the article from the article, wherein
   the cleaning-medium collecting unit includes a suction unit that is connected to the separating member and sucks air from the space.

5. The cleaning device according to claim 1, wherein the scraper member moves while being connected to the pool member.

6. The cleaning device according to claim 5, wherein the scraper member has air permeability to allow an air stream to pass therethrough but not to allow the cleaning medium to path therethrough.

7. The cleaning device according to claim 1, wherein the scraper member has air permeability to allow an air stream to pass therethrough but not to allow the cleaning medium to path therethrough.

8. A method of cleaning an article by blowing a cleaning medium by an air stream onto the article, the method comprising:
   generating an air stream in a cleaning tank while sucking air from inside the cleaning tank;
   cleaning an article that is placed at an opening of the cleaning tank by blowing the cleaning medium in air;
   collecting the cleaning medium entered in a clearance formed between the article and a flat surface of a pool member that is arranged on an outer edge of the opening back into the cleaning tank while intermittently generating an air stream; and
   sweepingly collecting and bringing, by a scraper member arranged on a holding unit that holds the article, the cleaning medium accumulated on the pool member back into the cleaning tank.

9. The method according to claim 8, wherein the scraper member moves sweepingly while contacting the pool member to collect and bring back the cleaning medium accumulated in the clearance between the article and the pool member into the cleaning tank.

10. A cleaning device that performs a cleaning of an article by positioning the article outside a cleaning tank and blowing a cleaning medium by an air stream onto the article, the cleaning device comprising:
    a cleaning tank that forms a space for the cleaning medium to be blown, the cleaning tank including an opening;
    a holding unit that holds the article at the opening;
    a cleaning-medium accelerating unit that causes the cleaning medium to be blown in air;
    a pool member that is arranged on an outer edge of the opening with a clearance between the pool member and the article held by the holding unit;
    a cleaning-medium collecting unit that generates a suction air stream in the clearance, wherein
    the cleaning-medium collecting unit brings the cleaning medium accumulated in the clearance back into the cleaning tank by generating an air stream that is directed toward the space in the clearance by sucking air from the space so as to develop a pressure difference between inside and outside of the space; and a scraper member that is arranged on the holding unit and sweepingly collects the cleaning medium accumulated on the pool member.

11. The cleaning device according to claim 10, wherein the cleaning-medium accelerating unit repeatedly discharges an air stream and stops discharging the air stream by intermittent drive operation.

12. A method of cleaning an article, the method comprising:
    generating an air stream in a cleaning tank while sucking air from inside the cleaning tank;
    cleaning an article that is placed outside an opening of the cleaning tank by blowing a cleaning medium by an air stream onto the article;
    bringing the cleaning medium entered in a clearance formed between the article and a pool member arranged on an outer edge of the opening of the cleaning tank back into the cleaning tank by generating a suction air stream that is directed toward the cleaning tank from the clearance while intermittently generating an air stream; and
    sweepingly collecting and bringing, by a scraper member arranged on a holding unit that holds the article, the cleaning medium accumulated in the clearance between the article and the pool member back into the cleaning tank.

13. The method according to claim 12, wherein the scraper member moves sweepingly while contacting the pool member to collect and bring back the cleaning medium accumulated in the clearance between the article and the pool member into the cleaning tank.

* * * * *